United States Patent
Palzer

(10) Patent No.: US 12,535,406 B2
(45) Date of Patent: Jan. 27, 2026

(54) PHOTOACOUSTIC GAS SENSOR, AND METHOD FOR PRODUCING SAME

(71) Applicant: TECHNISCHE UNIVERSITÄT DORTMUND, Dortmund (DE)

(72) Inventor: Stefan Palzer, Dortmund (DE)

(73) Assignee: TECHNISCHE UNIVERSITÄT DORTMUND, Dortmund (DE)

( * ) Notice: Subject to any disclaimer, the term of this patent is extended or adjusted under 35 U.S.C. 154(b) by 284 days.

(21) Appl. No.: 18/288,918

(22) PCT Filed: Apr. 29, 2022

(86) PCT No.: PCT/EP2022/061598
§ 371 (c)(1),
(2) Date: Oct. 30, 2023

(87) PCT Pub. No.: WO2022/229447
PCT Pub. Date: Nov. 3, 2022

(65) Prior Publication Data
US 2024/0201070 A1    Jun. 20, 2024

(30) Foreign Application Priority Data
Apr. 29, 2021 (DE) .................... 10 2021 111 012.2

(51) Int. Cl.
*G01N 21/17* (2006.01)

(52) U.S. Cl.
CPC . *G01N 21/1702* (2013.01); *G01N 2021/1704* (2013.01)

(58) Field of Classification Search
None
See application file for complete search history.

(56) References Cited

U.S. PATENT DOCUMENTS

| | | | |
|---|---|---|---|
| 6,344,647 B1 | 2/2002 | Jourdain et al. | |
| 9,513,261 B2 * | 12/2016 | Dehe | ................... G01N 21/1702 |

(Continued)

FOREIGN PATENT DOCUMENTS

| | | |
|---|---|---|
| CN | 111707619 A | 9/2020 |
| DE | 102016205024 A1 | 9/2016 |
| DE | 102017204817 A1 | 9/2018 |

(Continued)

OTHER PUBLICATIONS

International Search Report for International Application No. PCT/EP2022/061598 dated Sep. 19, 2022 (3 pages).

(Continued)

*Primary Examiner* — Suman K Nath
(74) *Attorney, Agent, or Firm* — REISING ETHINGTON, P.C.

(57) ABSTRACT

A method for producing a photoacoustic gas sensor for a target gas, having the steps of a) providing a wafer made of silicon, having a front face and a rear face. The wafer having a buried insulating layer within the silicon. The method including b) providing a suspended thermal emitter having a first cavity on the rear face of the wafer. The method including c) providing a sound-sensitive element on the front face of the wafer, the sound-sensitive element having a second cavity in which the target gas is enclosed. The additionally relates to a photoacoustic gas sensor for a target gas.

11 Claims, 2 Drawing Sheets

(56) References Cited

U.S. PATENT DOCUMENTS

2017/0288125 A1* 10/2017 Glacer .................... G01J 3/108
2021/0181158 A1* 6/2021 Schaller ............... G01N 29/348

FOREIGN PATENT DOCUMENTS

| DE | 102019134279 B3 | 5/2021 |
| EP | 3919890 A1 | 12/2021 |
| WO | WO2021038099 A1 | 3/2021 |

OTHER PUBLICATIONS

English Translation of International Search Report for International Application No. PCT/EP2022/061598 dated Sep. 19, 2022 (2 pages).
Bierer, Benedikt et. al. Chemical Engineering and Technology 2018, 41, No. 4, 696-701—"Real-Time Gas Quality Data for On-Demand Production of Biogas".

\* cited by examiner

PHOTOACOUSTIC GAS SENSOR, AND METHOD FOR PRODUCING SAME

INTRODUCTION

The disclosure relates to a photoacoustic gas sensor for a target gas.

In addition, the disclosure relates to a method for producing a photoacoustic gas sensor for a target gas.

A gas sensor is a sensor for detecting gaseous substances—in other words, for detecting the target gas. The amount of the target gas in the gas being analyzed, which is to say a piece of chemical information, is converted into an electrical signal by the gas sensor. Many possibilities for converting the chemical information into the electrical signal are known, which also give rise to advantages and disadvantages of different sensor types.

In the case of resistive principles, the target gas directly influences the conductivity of a gas-sensitive sensor layer, which is composed of an inorganic metal-oxide semiconductor (MOX), for example. Advantages of this measurement principle are the possibility of micromechanical manufacture as well as high sensitivity. Disadvantages thereof, however, are an aging-induced drift in the sensor signal as well as low selectivity.

On the other hand, a method with very high selectivity, long-term stability and reproducibility is provided by non-dispersive infrared spectroscopy (NDIR). An NDIR setup consists essentially of a spectrally broadband light source, an optical path and a photodetector whose spectral response is limited by means of suitable spectral filters. It is problematic, however, that current NDIR setups do not permit production in microsystem technology, since the sensitivity is mainly determined by the optical path.

Photoacoustic spectroscopy (PAS), with which gases can be detected very precisely and selectively, offers a possibility for making the construction smaller. The basic measurement principle is as follows: when a gas sample to be analyzed is irradiated in a measuring cell with a pulsed light source, then the gas molecules absorb the light, and the gas sample heats up. With a constant volume size of the measuring cell, this causes acoustic waves to be produced whose frequency corresponds to the modulation frequency of the light source. These acoustic waves, or, in other words, the photoacoustic signal, can be detected with acoustically sensitive elements (e.g., microphones). The signal amplitude correlates with the strength of the absorption, and thus provides information about the gas concentration in the measuring cell. Due to the structure, no photodetector is necessary.

The publication Chem. Eng. Technol. 2018, 41, No. 4, 696-701—"Real-Time Gas Quality Data for On-Demand Production of Biogas"—describes a gas sensor that is based on the photoacoustic measurement principle and is suitable for detecting methane as well as carbon dioxide.

Production methods for known photoacoustic gas sensors are based on the use of multiple wafers, which are joined to one another by means of welding, soldering and/or anodic joining processes. Due to the manufacturing-related joints, robustness and also miniaturization of the known photoacoustic gas sensors are limited. Moreover, the production method entails increased effort and costs.

SUMMARY

An object of the disclosure, per an embodiment, is therefore to provide a production method that simplifies the process of producing photoacoustic gas sensors. In particular, one goal is to provide a method that does not require joining multiple wafers to one another. In addition, another object of the disclosure, per an embodiment, is to provide a robust photoacoustic gas sensor, which additionally permits cost-effective manufacture.

According to the disclosure, per an embodiment, therefore, a method is provided for producing a photoacoustic gas sensor for a target gas comprising the steps:

a) Provision of a wafer made of silicon having a front side and a back side, wherein the wafer includes a buried insulation layer within the silicon;

b) Implementation of a suspended thermal emitter including a first cavity on the back side of the wafer;

c) Implementation of an acoustically sensitive element on the front side of the wafer, wherein the acoustically sensitive element includes a second cavity in which the target gas is contained, wherein steps b) and c) are implemented by means of photolithographic processes and etching processes in such a manner that the first cavity and the second cavity are separated from one another solely by the buried insulation layer.

According to the disclosure, per an embodiment, a photoacoustic gas sensor for a target gas is provided in addition, comprising a thermal emitter, a measuring volume designed as a first cavity and an acoustically sensitive element, wherein a gas and/or gas mixture to be analyzed can flow through the measuring volume, wherein the acoustically sensitive element includes a second cavity in which the target gas is contained, and wherein the first cavity and the second cavity are separated from one another solely by a buried insulation layer of a silicon wafer used for production.

One core concept of the disclosure, per an embodiment, is that the photoacoustic gas sensor is produced starting from exactly one wafer made of silicon. The wafer, which is provided in the first step of the method, has the buried insulation layer in this case. A buried insulation layer is to be understood as a layer in the interior of the silicon wafer that runs parallel to the front side and to the back side of the wafer and that is not made of silicon. Instead, the buried insulation layer comprises a material that preferably functions as an etch stop in the etching process. In this method, one cavity each is implemented on the front side and on the back side of the wafer, starting from the exactly one wafer. In this way, two cavities are produced that are separated from one another by the buried insulation layer. The first cavity forms the measuring volume of the gas sensor here, and the gas and/or gas mixture to be analyzed can flow through it. The acoustically sensitive element, which includes the second cavity, serves as detection device. The same gas species as the gas that is to be detected with the gas sensor—in other words, the target gas—is contained in the second cavity. Thus, gas cannot flow through the second cavity. The gas sensor is therefore a sensor that is specific to the target gas. In other words, the target gas is the particular gas species whose presence and/or amount in a gas and/or gas mixture being analyzed is to be detected with the gas sensor. "Gas sensor for a target gas" thus means, for instance, a gas sensor for $CO_2$, which means, on the one hand, that the gas sensor can detect $CO_2$ in a gas and/or gas mixture to be analyzed that flows through the first cavity, and preferably can determine the amount of $CO_2$ in the gas and/or gas mixture, and, on the other hand, also means that $CO_2$ is contained in the second cavity of the gas sensor.

Moreover, the target gas that is contained in the second cavity can also be a gas mixture, which is to say a gas mixture that comprises more than one gas species. For instance, the target gas can be a mixture of CO2 and methane. In this way, a gas sensor is provided that is specific to the multiple gas species occurring in the gas mixture, which is to say a gas sensor for CO2 and methane in the present example.

With respect to the buried insulation layer, provision is preferably made, per an embodiment, that the buried insulation layer has a transmittance of at least 40% for electromagnetic radiation of a wavelength used for detecting the target gas. Using the example of a gas sensor for CO2, this means the following: Since CO2 has, among other things, a vibrational band at approximately 2380 to 2320 cm−1 (approximately 4200 nm to 4300 nm), radiation of this wavelength can be used for the detection of CO2. Consequently, provision is preferably made for the example of the CO2 sensor that the transmittance of the buried insulation layer is 40% for radiation at approximately 2380 to 2320 cm−1. In the case of a gas sensor that is specific to multiple gas species, which is to say the target gas is a gas mixture comprising multiple gas species, provision is preferably made that the buried insulation layer has a transmittance of at least 40% for electromagnetic radiation of the particular wavelengths that are used for detection of the multiple gas species of the target gas.

With respect to the production method according to the disclosure, per an embodiment, therefore, no joining process between multiple wafers takes place. In particular, the method does not make provision to join the first cavity and the second cavity to one another. Instead, using the one wafer that has the buried insulation layer in its interior as the starting point, the first and the second cavity are implemented by the removal of material. In particular, the buried insulation layer functions as an etch stop during the production of the first and second cavities by means of an etching process, so that the first and second cavities are now separated from one another solely by the buried insulation layer after steps b) and c) have been performed. In the gas sensor produced by the method, the buried insulation layer thus forms a separator structure between the first cavity and the second cavity. At the same time, the buried insulation layer in the gas sensor produced by the method forms an optical window between the first cavity—the measuring volume—and the second cavity—the detection device.

The method provides essentially three steps. In the first step a), the wafer is provided. The wafer is a silicon wafer. It is possible in this connection for it to be a monocrystalline or polycrystalline wafer. The wafer preferably has a disk shape and/or a flat front side and a flat back side parallel thereto. Preferably, the wafer has a thickness between 0.5 and 2 mm. As already mentioned, the wafer has the buried insulation layer in the interior of the silicon. Thus, the wafer has the following layer structure in a cross-section perpendicular to the plane: silicon—buried insulation layer—silicon. Silicon as wafer material has the advantage that it is optically transparent to electromagnetic radiation in the IR range of above 1.1 μm.

In the second step b), the suspended thermal emitter that includes the first cavity is implemented on the back side of the wafer. The thermal emitter preferably is suspended on ribs and connected to the wafer by the ribs. Preferably, per an embodiment, the silicon of the wafer is removed by etching processes to implement the ribs and the thermal emitter, by which means the first cavity is produced at the same time.

In the third step c), the acoustically sensitive element is implemented on the front side of the wafer. The acoustically sensitive element includes the second cavity. The target gas is contained in the second cavity. For instance, if a gas sensor for methane is produced, methane is therefore contained in the second cavity.

Steps b) and c) can also be carried out in the reverse order. It is thus possible to first implement the acoustically sensitive element on the front side of the wafer and after that to implement the suspended thermal emitter on the back side of the wafer. Steps b) and c) are implemented by means of photolithographic processes and etching processes. These are processes that are customary in the production of components in microsystems technology.

Photolithography is a key process of semiconductor and microsystems technology for producing integrated circuits and other components. Here, an image of a photomask is transferred onto a light-sensitive photoresist with the aid of an exposure process. Subsequently, the exposed locations of the photoresist are dissolved. Alternatively, provision can also be made that the unexposed locations of the photoresist are dissolved when the photoresist cures under light. In this way, a lithographic mask is produced that permits further processing through chemical and physical processes, such as the introduction of material into the open windows or the etching of recesses under the open windows.

Physical and/or chemical actions that bring about a material removal process are used in chemical and physical etching processes, for example reactive ion etching, plasma etching, or wet chemical methods such as the etching of silicon with potassium hydroxide solution.

The method according to the disclosure, per an embodiment, thus makes it possible to produce the photoacoustic gas sensor with a monolithic structure starting from exactly one wafer, which makes the gas sensor very robust. Furthermore, the production method is greatly simplified, because the joining of multiple wafers can be forgone. Further advantages of the method, per certain embodiments, consist in the possibility of miniaturization of the photoacoustic gas sensor as well as the possibility to further reduce manufacturing costs through mass production.

Provision is preferably made, per an embodiment, that gas sensors that have dimensions of less than 2 mm can be produced with this method. Provision is likewise preferably made, per an embodiment, that the gas sensor has dimensions of less than 2 mm. This therefore preferably concerns a production method for micromechanical gas sensors, or a micromechanical gas sensor.

As already mentioned, this concerns a photoacoustic gas sensor. In terms of the measurement principle, the photoacoustic gas sensor takes advantage of the fact that gas molecules absorb only electromagnetic radiation of very specific wavelengths; which wavelengths these are depends on the gas species. In the case of photoacoustic measurements, the absorption is measured by means of a pressure transducer through the pressure increase resulting from the absorption. Moreover, the gas species to be detected is itself used as a gas-selective detector through the provision of the target gas in the second cavity. Consequently, no photodetector for electromagnetic radiation is required. To detect a specific gas species—in other words, the target gas—in a gas and/or gas mixture being analyzed, electromagnetic radiation is used whose wavelength can be absorbed by the target gas. Provision is preferably made, per an embodiment, that the thermal emitter is designed to emit electromagnetic radiation in a wavelength that can be absorbed by the target gas. Moreover, provision can be made with respect to the emission spectrum of the thermal emitter that the emission spectrum of the thermal emitter is matched to the absorption spectrum of the target gas, for example through photonic crystals.

The pressure increase caused by the absorption can be measured in the second cavity as a sound wave with the acoustically sensitive element. If target gas is likewise present in the gas or gas mixture being analyzed that flows through the first cavity, then a portion of the electromagnetic radiation emitted by the thermal emitter is already absorbed by the target gas in the gas or gas mixture being analyzed, which has effects on the sound wave measured in the second cavity. In the case of a target gas that comprises multiple gas species, the signals for the different gas species of the target gas can be distinguished from one another through, for example, different modulation frequencies of the thermal emitter.

With respect to the production method and in connection with step a), provision is made according to an improvement of the disclosure, per an embodiment, that a silicon-on-insulator wafer and/or a {100}Si wafer is provided in step a). A silicon-on-insulator wafer (SOI wafer) is a wafer in which a thin silicon layer is separated from the silicon substrate of the wafer by an electrically insulating layer (BOX, buried oxide). The SOI wafer thus has the buried insulation layer owing to the BOX layer.

A {100}Si wafer is a wafer in which the front side and the back side of the wafer are formed by the crystal plane that is designated by the Miller indices {100}. The orientation of the crystal plane influences the shape of the structures that are produced in the wafer by chemical etching processes. In chemical etching of a {100}Si wafer, trapezoidal trenches arise initially. The inclined side walls of the trenches are formed by the {111}Si surfaces, which have a lower etch rate than the {100}Si surfaces. Consequently, the thermal emitter and the acoustically sensitive element can be implemented especially simply through provision of the {100}Si wafer.

Provision is made according to another improvement of the disclosure, per an embodiment, that the wafer provided in step a) comprises a first insulation layer on the back side, a second insulation layer on the front side, and the buried insulation layer between the first insulation layer and the second insulation layer and within the silicon. In other words, therefore, a wafer is preferably provided in the first step whose front side and back side are furnished with an insulation layer. This further simplifies the production of the thermal emitter and the acoustically sensitive element. The wafer provided in step a) thus preferably has the following structure in a cross-section perpendicular to the plane, starting with the back side: first insulation layer—silicon—buried insulation layer—silicon—second insulation layer.

Alternatively thereto, provision can be made in this context that the method comprises the steps: Application of a first insulation layer on the back side of the wafer and/or application of a second insulation layer on the front side of the wafer. In this way, a wafer with the layer structure: first insulation layer—silicon—buried insulation layer—silicon—second insulation layer is implemented starting from a wafer with the layer structure: silicon—buried insulation layer—silicon.

The buried insulation layer preferably, per an embodiment, has a thickness of 1-100 μm. The first insulation layer preferably has a thickness of 1-2 μm, and the second insulation layer preferably has a thickness of 1-10 μm. These thicknesses of the insulation layers make it possible to produce the gas sensor in especially miniaturized construction.

As already mentioned, provision is preferably made, per an embodiment, with respect to the buried insulation layer that the buried insulation layer is made of a material that has a transmittance of at least 40% for the electromagnetic radiation used for detecting the target gas. Further preferably, the buried insulation layer is made of a material that has a transmittance of at least 40% for the electromagnetic radiation emitted by the thermal emitter. In this context, provision is made according to another improvement of the disclosure, per an embodiment, that the first insulation layer, the second insulation layer and/or the buried insulation layer comprise silicon dioxide, silicon carbide and/or sapphire. The buried insulation layer is preferably composed of silicon dioxide and/or sapphire. Silicon dioxide and sapphire have the advantage, per certain embodiments, that they are optically transparent to electromagnetic radiation in the IR range. Accordingly, the electromagnetic radiation in the IR range emitted by the thermal emitter can enter the second cavity from the first cavity unhindered. The first insulation layer preferably is made of a material that has a high emissivity in a wavelength range of the electromagnetic spectrum used for detecting the target gas. In this way, it is especially simple to implement an efficient thermal emitter on the back side of the wafer. Preferably, the first insulation layer is made of silicon carbide. This material has the advantage that it has a high emissivity (spectral emissivity) in the IR range.

As already mentioned, the first cavity in the gas sensor forms the measuring volume that the gas or gas mixture to be analyzed can flow through. The size of this measuring volume and, in particular, the distance between the thermal emitter and the second cavity—the detection chamber—influences the sensitivity of the gas sensor. In this context, provision is made according to an improvement of the disclosure, per an embodiment, that step a) comprises furnishing a wafer with a distance of 500 μm to 2000 μm between the buried insulation layer and the back side. Alternatively, provision is made that step a) comprises furnishing a wafer with a distance of 500 μm to 2000 μm between the buried insulation layer and the first insulation layer. In each case, this has the result in the gas sensor produced with the method that a distance between 500 μm and 2000 μm is likewise present between the buried insulation layer that forms the window to the detection chamber and the thermal emitter. By this means, a gas sensor is made possible that has a sufficiently high sensitivity and at the same time is small enough for many applications.

With respect to step b)—implementation of the thermal emitter—provision is made according to an improvement of the disclosure, per an embodiment, that step b) comprises an implementation of a suspended radiation source and/or of a suspended micromechanical hotplate on the back side of the wafer. A micromechanical hotplate, also referred to as a micro-hotplate (MHP), is a micromechanical component that is employed in many sensors as a heating device or radiation source. Preferably, the micromechanical hotplate comprises a heating structure, which preferably is designed as meandering wire on a carrier surface. In the gas sensor, the first cavity is located between the carrier surface and the buried insulation layer. Further preferably, the micromechanical hotplate comprises ribs by which the carrier surface of the heating device is joined to the wafer.

According to another improvement, per an embodiment, provision is additionally made in connection with the thermal emitter that step b) comprises an implementation of an IR emitter. This is advantageous since a number of target gases absorb in the IR range.

Likewise in connection with step b), provision is made according to another improvement of the disclosure, per an embodiment, that the wafer includes the first insulation layer on the back side, and step b) comprises the following steps:

Application of a heating structure to the first insulation layer by means of photolithographic processes, and Creation of the first cavity between the first insulation layer and the buried insulation layer in the region of the applied heating structure by means of chemical and/or physical etching processes.

Thus, in other words, the first insulation layer preferably forms the carrier surface and the ribs for the heating structure, wherein the carrier surface and the ribs are formed during creation of the first cavity by removal of silicon of the wafer. Especially preferably, per an embodiment, provision is made that the creation of the first cavity between the first insulation layer and the buried insulation layer in the region of the applied heating structure comprises a partial removal of the first insulation layer next to the applied heating structure, especially preferably by reactive ion etching of the back side of the wafer and a subsequent wet chemical etching of the silicon of the wafer between the first insulation layer and the buried insulation layer in the region of the applied heating structure. As already mentioned, an advantageous feature of the method, per an embodiment, is that the buried insulation layer functions as an etch stop during the subsequent wet chemical etching. The first cavity, which extends up to the buried insulation layer, is thus implemented in this way.

Reactive ion etching (RIE) is an etching process in which etching takes place by means of reactive ions that are produced in a gas discharge. In RIE, a physical component, namely removal through ejection of particles, and also a chemical component, namely removal through chemical reaction, work together in the removal process.

In wet chemical etching, etching solutions such as potassium hydroxide solution (KOH) are used in order to achieve a removal process through chemical reaction. The etching process can be direction-dependent, by which means different structures can be achieved.

In connection with step c)—implementation of the acoustically sensitive element—provision is made according to another improvement of the disclosure, per an embodiment, that step c) comprises an implementation on the front side of the wafer of a microphone in which the target gas is contained. This is preferably a condenser microphone in microsystems technology (MEMS microphone), in which the micromembrane that changes the electrical capacitance is implemented directly on the wafer.

Likewise in connection with step c), provision is made in accordance with another improvement of the disclosure, per an embodiment, that the wafer on the front side includes the second insulation layer, and step c) comprises the following steps:

Partial removal of the second insulation layer by means of chemical and/or physical etching processes, Application of a cover plate to the front side of the wafer by means of photolithographic processes, wherein the cover plate has a perforated structure in the region of the removed second insulation layer, Creation of the second cavity between the cover plate and the buried insulation layer in the region of the perforated structure by means of chemical etching processes, and Sealing of the second cavity under target gas atmosphere by the application of a sealing layer to the cover plate under target gas atmosphere.

In an embodiment, the second insulation layer is removed on the front side in a region that corresponds to the applied heating structure and/or to the suspended thermal emitter on the back side. In other words, therefore, the second insulation layer preferably is removed opposite the heating structure and/or opposite the thermal emitter. In this way, the acoustically sensitive element is implemented directly opposite the first cavity, and, consequently, it is ensured that the first cavity and the second cavity are separated from one another solely by the buried insulation layer. During implementation of the acoustically sensitive element, the second insulation layer and the partially exposed silicon of the wafer preferably serve initially as supports for the cover plate, which has a perforated structure in the region of the removed second insulation layer and preferably forms the microphone diaphragm in this way.

After that, the silicon of the wafer that serves as a support under the perforated structure is preferably etched away, producing the second cavity. In order to introduce the target gas into the second cavity, the sealing layer is applied to the cover plate and thus also to the second cavity, preferably under target gas atmosphere.

In an embodiment, provision is made that the buried insulation layer functions as an etch stop during creation of the second cavity by means of chemical etching processes, in particular wet chemical etching. In this way, it can be ensured in a simple manner that the second cavity is separated from the first cavity by the insulation layer.

As already mentioned, the disclosure, per an embodiment, also relates to the photoacoustic gas sensor. The photoacoustic gas sensor for the target gas comprises the thermal emitter, the measuring volume designed as a first cavity, and the acoustically sensitive element, wherein the gas to be analyzed can flow through the measuring volume, wherein the acoustically sensitive element includes the second cavity in which the target gas is contained, and wherein the first cavity and the second cavity are separated from one another solely by the buried insulation layer of the silicon wafer used for production.

In contrast to gas sensors that are produced by the joining of multiple wafers, the photoacoustic gas sensor according to the disclosure, per an embodiment, is a gas sensor in monolithic construction. In this design, the photoacoustic gas sensor has only the buried insulation layer between the first cavity and the second cavity.

In addition, provision is made according to an improvement, per an embodiment, that no adhesive layer is present between the first cavity and the second cavity. Instead, on the one hand, the buried insulation layer forms the separator structure between the first cavity and the second cavity, and, at the same time, as an inherent component of the wafer, it provides the monolithic structure of the photoacoustic gas sensor.

BRIEF DESCRIPTION OF THE FIGURES

The disclosure is explained in further detail below on the basis of a preferred exemplary embodiment of the disclosure with reference to the drawings.

The drawings show.

DETAILED DESCRIPTION

Figure 1:
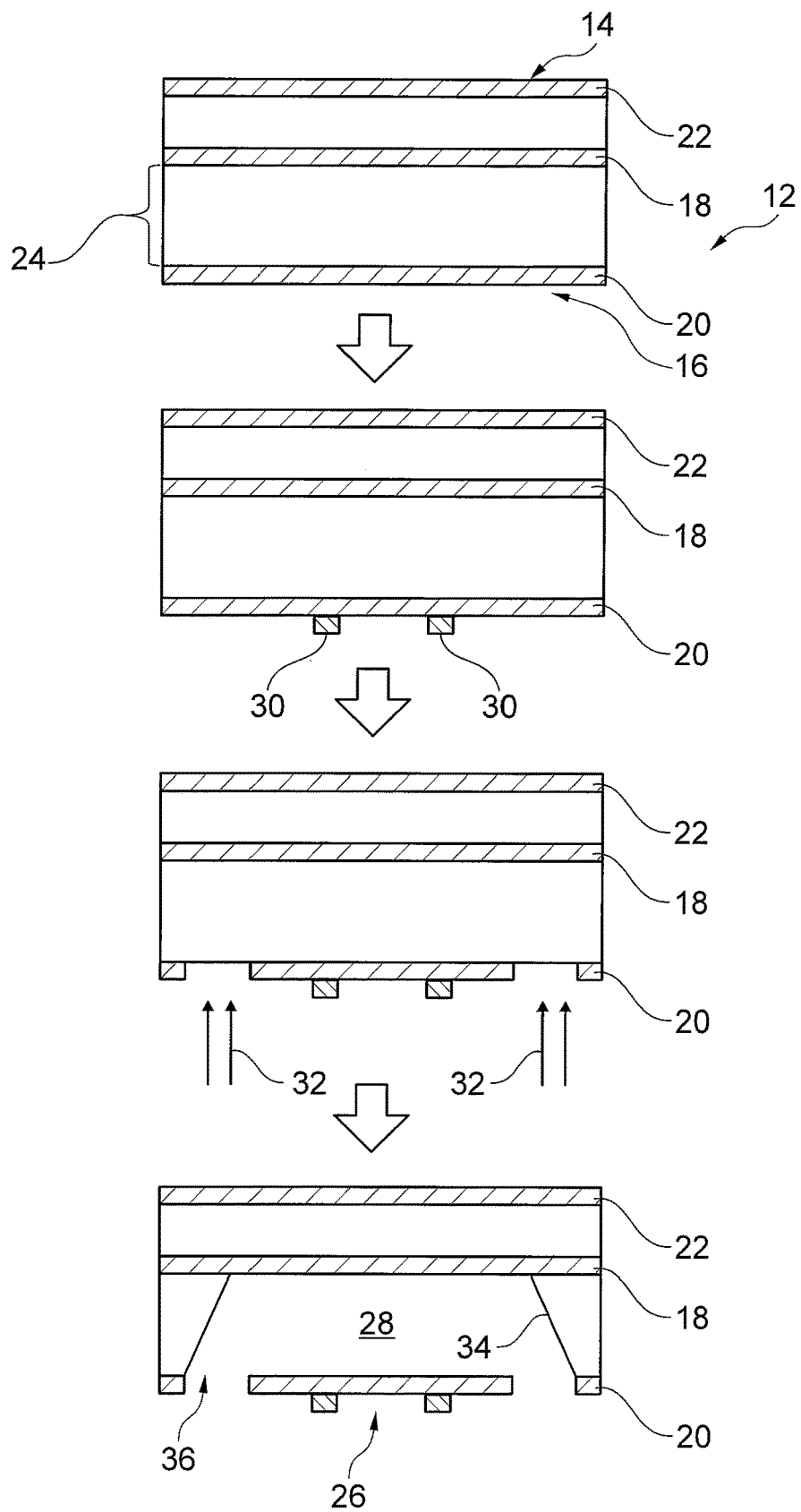
FIGS. 1 and 2 schematic representations of the steps of a method for producing a photoacoustic gas sensor according to an exemplary embodiment of the disclosure.
Figure 2:
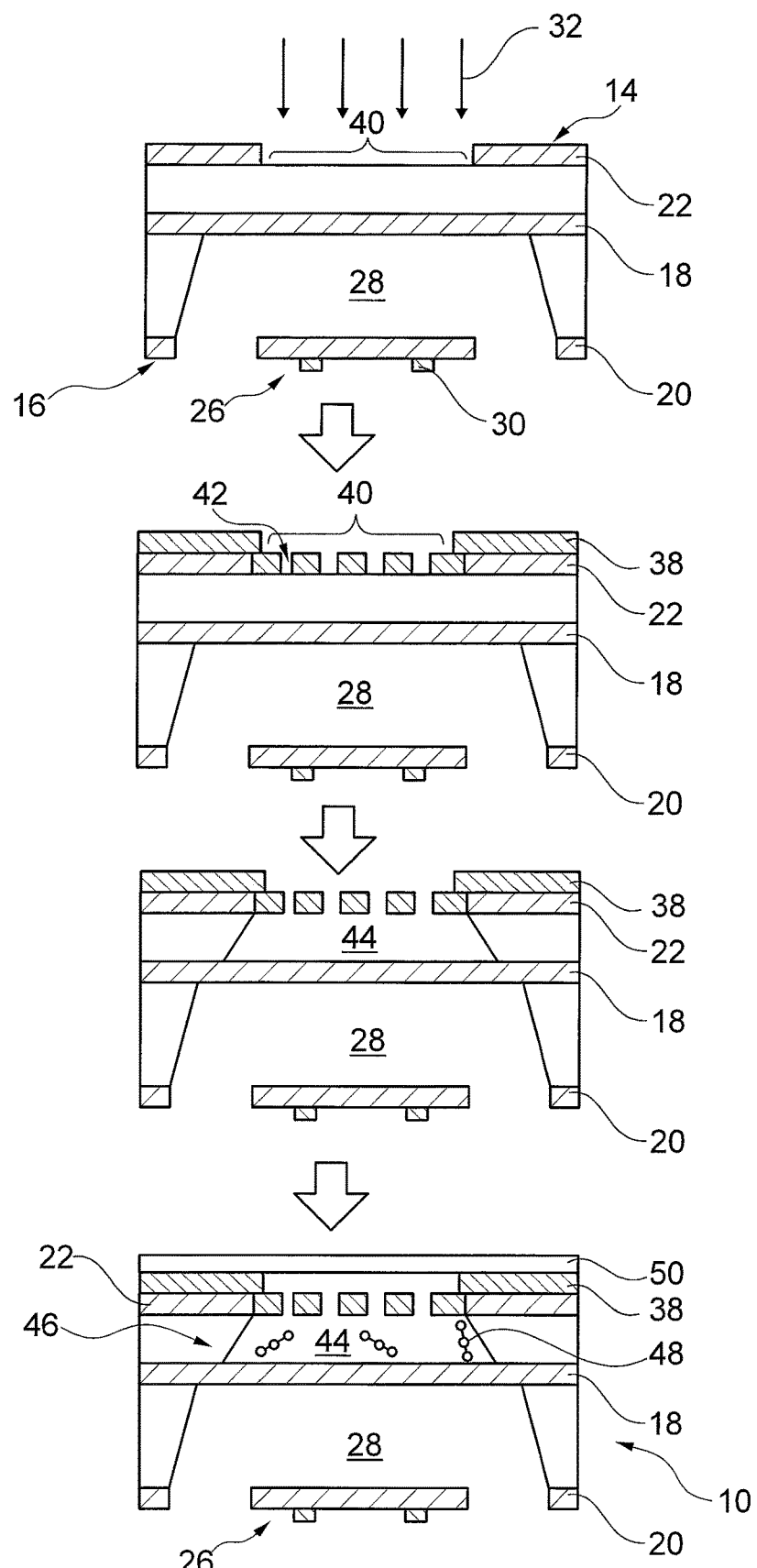

The steps for producing a photoacoustic gas sensor 10 are shown schematically in FIGS. 1 and 2. In the present exemplary embodiment, the sensor is a CO2 microsensor 10 with a monolithic construction.

In the first step of the method, a wafer 12 made of silicon is provided, which is depicted at the very top in FIG. 1. The wafer 12 has a front side 14 and a back side 16. In addition, the wafer 12 has a buried insulation layer 18 within the silicon. The wafer 12 provided in this exemplary embodiment is an SOI wafer 12 that additionally has yet another insulation layer 20, 22 on each of its surfaces, which is to say the front side 14 and the back side 16. In the present case, the wafer 12 provided thus has the first insulation layer 20 on the back side 16, and the second insulation layer 22 on the front side 14, as well as the buried insulation layer 18 between the first insulation layer 20 and the second insulation layer 22 and within the silicon. Moreover, the wafer 12 provided in the present exemplary embodiment is a {100}Si wafer, which means that the front side 14 and back side 16 of the wafer 12 are formed by the crystal plane {100}.

The insulation layers 18, 20, and 22 of the wafer 12 are all made of silicon dioxide in the present case. Furthermore, a distance 24 between the first insulation layer 20 and the buried insulation layer 22 is 1000 µm in the present case. The first insulation layer 20 in the present case is 1.5 µm thick and the second insulation layer in the present case is 5 µm thick, while the buried insulation layer 18 has a thickness of 30 µm.

In the second step of the method, a suspended thermal emitter 26 including a first cavity 28 is implemented on the back side 16 of the wafer 12. In the present case, the suspended thermal emitter 26 is designed as micro-hotplate 26, which emits electromagnetic radiation in the IR range. The first cavity 28 extends from the thermal emitter 26 to the buried insulation layer 18. The thermal emitter 26 implemented according to this method step is shown at the very bottom in FIG. 1, while the figures therebetween schematically represent the intermediate steps, showing how the thermal emitter 26 is implemented by means of photolithographic processes and etching processes.

In the present exemplary embodiment, the thermal emitter 26 and the first cavity 28 are implemented by applying a heating structure 30 to the first insulation layer 20 by means of photolithographic processes. After that, the first insulation layer 20 is partially removed next to the applied heating structure 30 by reactive ion etching, which is symbolically represented in FIG. 1 by arrows 32. In this way, the silicon of the wafer 12 is exposed. After that, the exposed silicon is removed in the region of the applied heating structure 30 by wet chemical etching using potassium hydroxide solution, creating the first cavity 28. The buried insulation layer 18 serves directly as an etch stop during the wet chemical etching process. Due to the anisotropic etching process, the first cavity 18 has inclined side walls 34, which are formed by the crystal plane {111} of the silicon of the wafer 12. In addition, the first cavity 28 has at least two openings 36, namely at the locations where the first insulation layer 20 was partially removed. These openings 36 make it possible for the gas and/or gas mixture being analyzed to flow into the first cavity 28 in the gas sensor 10 produced with the method, so that the first cavity 28 in the gas sensor 10 can assume the function of the measuring volume. After the second method step, therefore, the thermal emitter 26 and the first cavity 28 are implemented on the back side 16 of the wafer 12 (very bottom in FIG. 1).

In the subsequent third method step, the front side 14 of the wafer 12 is processed, shown in FIG. 2. The objective of the further steps is to implement an acoustically sensitive element 46 including a second cavity 44 on the front side 14, wherein the target gas 48—CO2 in the present case—is introduced into the second cavity 44 (very bottom in FIG. 2).

In order to achieve this, the second insulation layer 22 is removed by reactive ion etching 32 in a region 40 on the front side 14 of the wafer 12, which corresponds essentially to the region of the suspended thermal emitter 26 on the back side 16 (very top in FIG. 2). After that, a cover plate 38, which has a perforated structure 42 in the region 40 of the removed second insulation 22, is applied by means of photolithographic processes to the exposed silicon of the wafer 12 as well as to the second insulation layer 22 that is still present.

Furthermore, the second cavity 44 is implemented in the region 40 in that the silicon of the wafer 12 is removed up to the buried insulation layer 18 by wet chemical etching using potassium hydroxide solution. Analogously to the wet chemical etching during processing of the back side 16 of the wafer 12 in the second method step, the buried insulation layer 18 also serves as an etch stop in the present case during processing of the front side 14 of the wafer 12. Accordingly, the first cavity 28 and the second cavity 44 are now separated from one another solely by the buried insulation layer 18.

In order to implement the acoustically sensitive element 46, eventually the second cavity 44 is sealed by the application of a sealing layer 50 to the cover plate 38 under an atmosphere of the target gas 48—CO2 in the present case. In this way, the microsensor 10 having dimensions of 2×2 mm2 in monolithic construction, which is to say starting from exactly one wafer 12 and without joining multiple wafers to one another, can be provided by the method.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 10 gas sensor, $CO_2$ sensor
12 silicon wafer
14 front side
16 back side
18 buried insulation layer
20 first insulation layer
22 second insulation layer
24 distance between first insulation layer and buried insulation layer
26 thermal emitter
28 first cavity, measuring volume
30 heating structure
32 reactive ion etching, arrow
34 side wall, crystal plane {111}
36 opening
38 cover plate
40 region corresponding to thermal emitter
42 holes in cover plate, perforated structure
44 second cavity
46 acoustically sensitive element
48 target gas, $CO_2$
50 sealing layer
10 gas sensor, $CO_2$ sensor
12 silicon wafer
14 front side
16 back side
18 buried insulation layer
20 first insulation layer
22 second insulation layer
24 distance between first insulation layer and buried insulation layer
26 thermal emitter
28 first cavity, measuring volume
30 heating structure

The invention claimed is:

1. A method for producing a photoacoustic gas sensor for a target gas, comprising the following steps:
   a) providing of a wafer made of silicon having a front side and a back side, wherein the wafer includes a buried insulation layer within the silicon;
   b) providing of a suspended thermal emitter including a first cavity on the back side of the wafer;
   c) providing of an acoustically sensitive element on the front side of the wafer, wherein the acoustically sensitive element includes a second cavity in which the target gas is contained,
   wherein steps b) and c) are implemented by means of photolithographic processes and etching processes in such a manner that the first cavity and the second cavity are separated from one another solely by the buried insulation layer.

2. The method according to claim 1, wherein step a) comprises providing a silicon-on-insulator wafer and/or a provision of a Si wafer, and/or wherein the wafer comprises a first insulation layer on the back side, a second insulation layer on the front side, and the buried insulation layer between the first insulation layer and the second insulation layer and within the silicon.

3. The method according to claim 2, wherein the first insulation layer, the second insulation layer and/or the buried insulation layer comprises silicon dioxide, silicon carbide, and/or sapphire.

4. The method according to claim 1, wherein step a) comprises providing a wafer with a distance of 500 μm to 2000 μm between the buried insulation layer and the back side, or wherein step a) comprises providing a wafer with a distance of 500 μm to 2000 μm between the buried insulation layer and the first insulation layer.

5. The method according to claim 1, wherein step b) comprises providing a suspended radiation source and/or of a suspended micromechanical hotplate on the back side of the wafer.

6. The method according to claim 1, wherein step b) comprises providing an IR emitter.

7. The method according to claim 1, wherein the wafer provided in step a) includes a first insulation layer on the back side comprises the following steps: providing a heating structure to the first insulation layer by means of photolithographic processes, and providing the first cavity between the first insulation layer and the buried insulation layer in the region of the applied heating structure by means of chemical and/or physical etching processes.

8. The method according to claim 1, wherein step c) comprises providing on the front side of the wafer of a microphone in which the target gas is contained.

9. The method according to claim 1, wherein the wafer provided in step a) includes a second insulation layer on the front side, and step c) comprises the following steps: partially removing the second insulation layer by means of chemical and/or physical etching processes, applying a cover plate to the front side of the wafer by means of photolithographic processes, wherein the cover plate has a perforated structure in the region of the removed second insulation layer, providing the second cavity between the cover plate and the buried insulation layer in the region of the perforated structure by means of chemical etching processes, and Sealing of the second cavity under target gas atmosphere by the application of a sealing layer to the cover plate under target gas atmosphere.

10. A photoacoustic gas sensor for a target gas, comprising:
    a thermal emitter, a measuring volume designed as a first cavity and an acoustically sensitive element, wherein a gas and/or gas mixture to be analyzed can flow through the measuring volume, wherein the acoustically sensitive element includes a second cavity in which the target gas is contained, and wherein the first cavity and the second cavity are separated from one another solely by a buried insulation layer of a silicon wafer used for production.

11. The photoacoustic gas sensor according to claim 10, wherein no adhesive layer is present between the first cavity and the second cavity.

* * * * *